Feb. 4, 1941. E. WILDHABER 2,230,418
GEAR
Filed Dec. 31, 1937 6 Sheets-Sheet 2

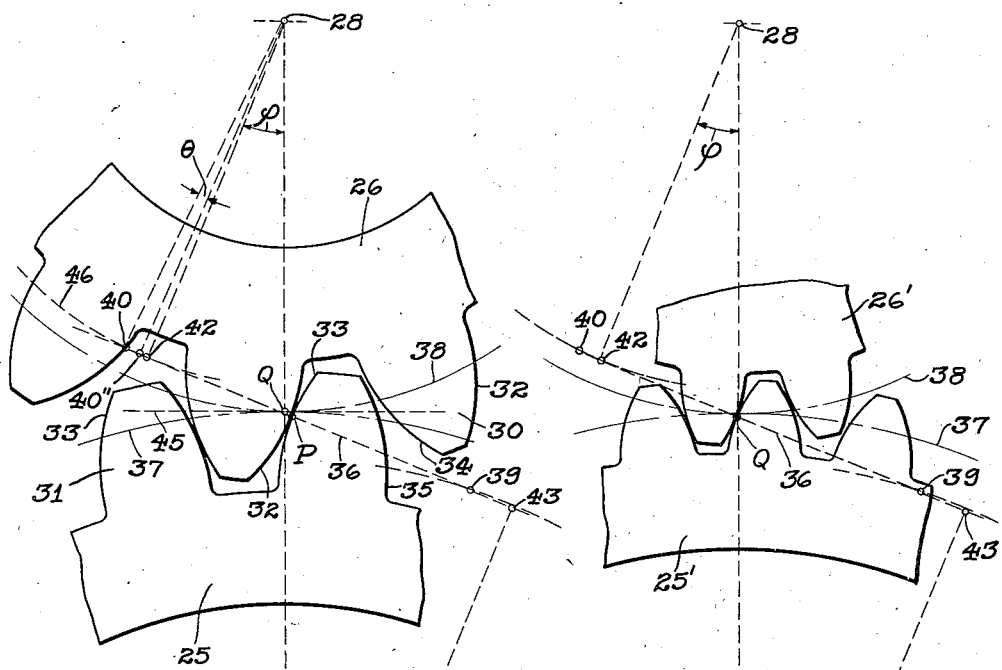
Fig. 1
Fig. 2
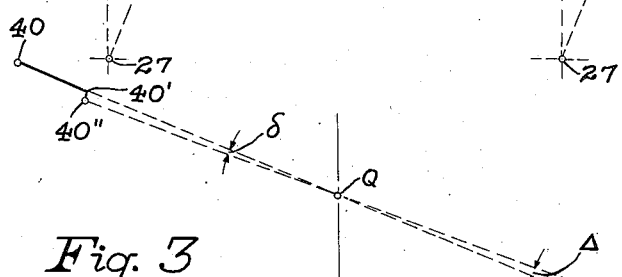
Fig. 3

Ernest Wildhaber
INVENTOR

BY *[signature]*
ATTORNEY

Feb. 4, 1941.  E. WILDHABER  2,230,418
GEAR
Filed Dec. 31, 1937  6 Sheets-Sheet 3
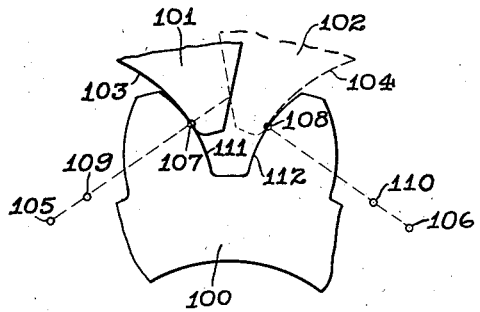
Fig. 10
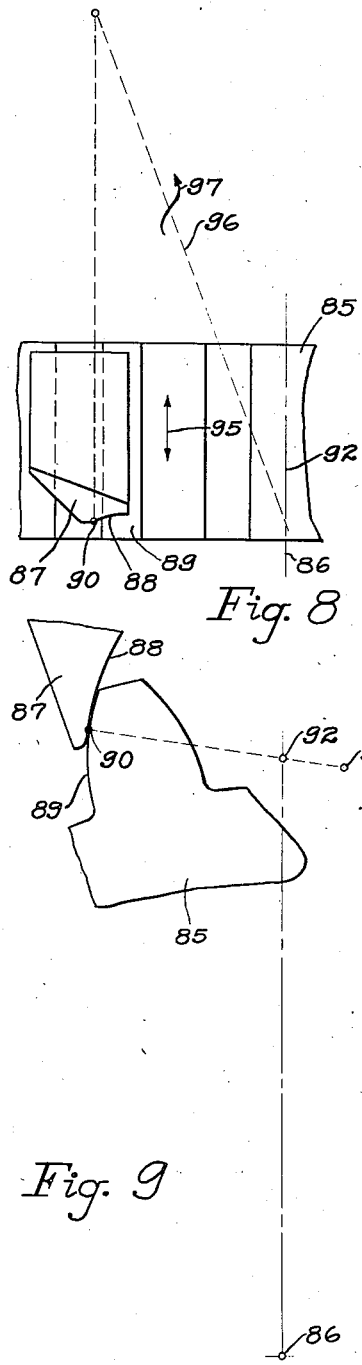
Fig. 8
Fig. 9
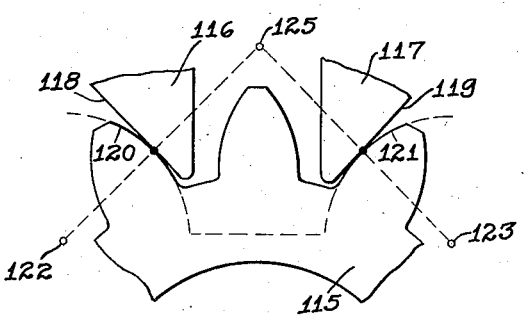
Fig. 11
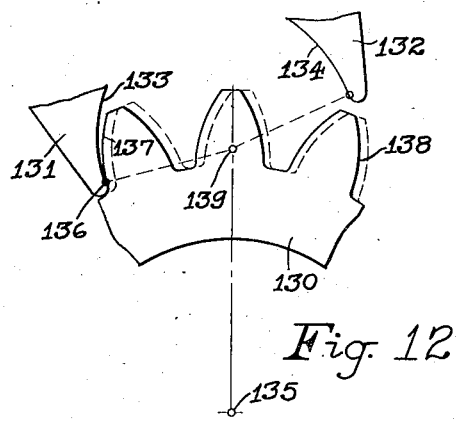
Fig. 12
Ernest Wildhaber
INVENTOR
BY *B. E. Schlesinger*
ATTORNEY

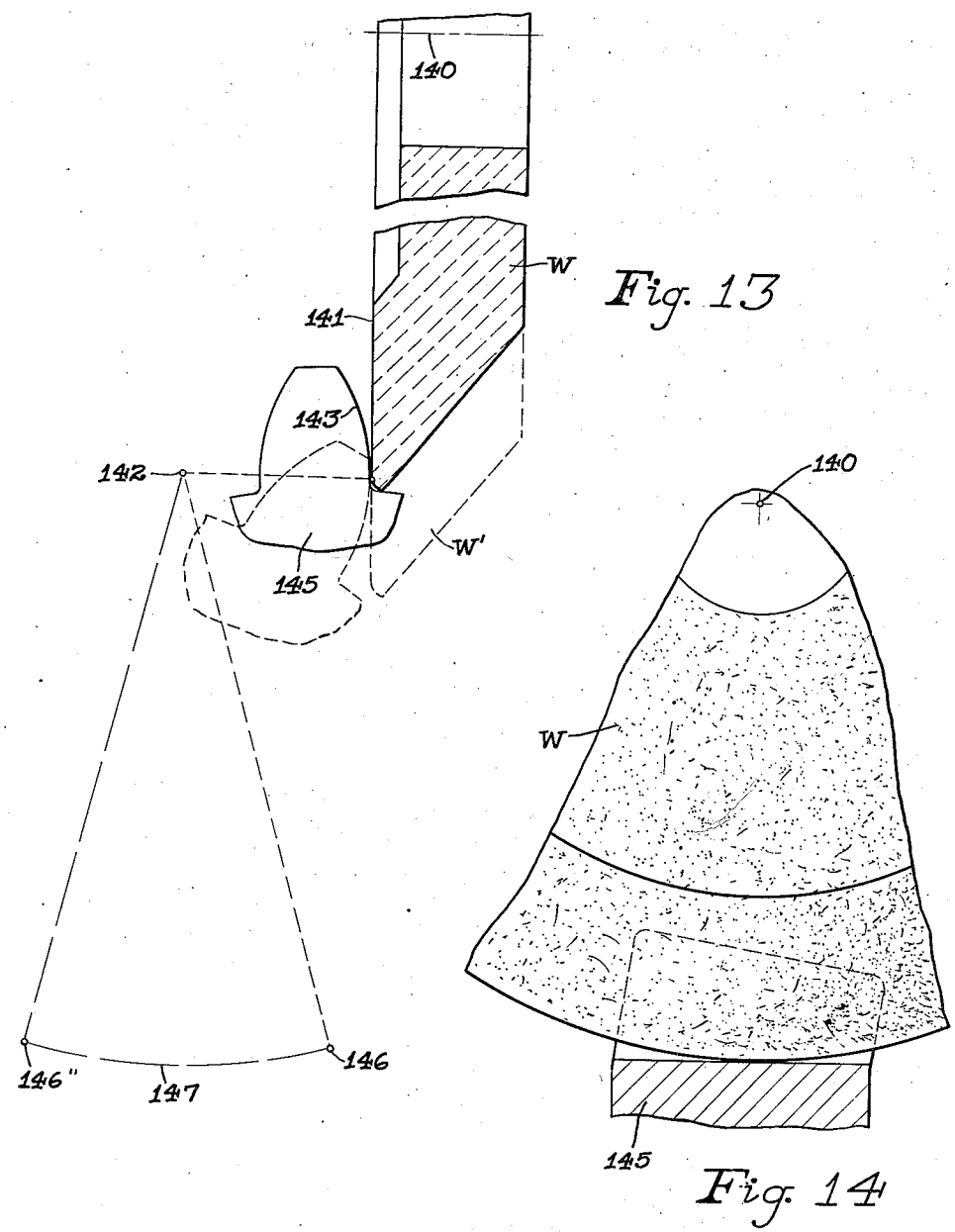

Feb. 4, 1941.  E. WILDHABER  2,230,418
GEAR
Filed Dec. 31, 1937   6 Sheets-Sheet 5

Ernest Wildhaber
INVENTOR
BY
ATTORNEY

Ernest Wildhaber
INVENTOR

Patented Feb. 4, 1941

2,230,418

UNITED STATES PATENT OFFICE 2,230,418

GEAR

Ernest Wildhaber, Irondequoit, N. Y., assignor to Gleason Works, Rochester, N. Y., a corporation of New York Application December 31, 1937, Serial No. 182,837

16 Claims. (Cl. 74—462)

The present invention relates to gears and to their manufacture, and particularly to straight toothed gears, spur, helical, bevel, and hypoid, and to the manufacture of such gears.

One purpose of the present invention is to provide a tooth shape for gears which will be very easy to produce and which will permit of cutting gears of the type described on machines of extremely simple construction.

A kindred object of the invention is to provide a tooth shape for gears which may be produced without generating roll so that the operation of cutting the gears may not only be simple but fast.

A further object of the invention is to provide a tooth shape for gears which will be free of undercut and which thereby will be of increased strength.

Another object of the invention is to provide straight toothed gears whose mating tooth surfaces will mesh with less than full profile contact and also with less than full length contact so that mate gears will run quietly when in mesh and be capable, moreover, of adjustment relative to one another and readily accommodate themselves to any variations in mountings and loads which may be met with in use.

Still another object of the invention is to provide a tooth form for bevel gears which may be milled or ground very easily and very accurately.

A further object of the invention is to provide simple, accurate methods for producing gears of the character described either in intermittent or continuous indexing processes.

Other objects of the invention will be apparent hereinafter from the specification and from the recital of the appended claims.

According to the present invention, both gears of a pair of unequal gears are provided with tooth profiles which are single, convex circular arcs or which closely approximate single, convex circular arcs. Moreover, the ratio of the radii of profile curvature of the teeth of the smaller and larger gears is greater than the ratio of the respective tooth numbers of the two gears, in the case of spur gears, or is greater than the ratio of the tooth numbers of the respective developed complete back cones in the case of bevel gears. The tooth surfaces of gears produced according to this invention may be either cylindrical or conical or may closely approximate such surfaces.

Gears having the characteristics of the present invention may be produced in various ways. Their tooth surfaces may be cut or ground with a milling cutter or grinding wheel of circular or nearly circular profile by adjusting the cutter or wheel into full depth engagement with the gear blank and moving the tool along the length of a tooth. Their tooth surfaces may be cut with a reciprocating tool of circular or nearly circular cutting profile by imparting a cutting motion to the tool and producing a relative feed movement between the tool and gear blank until the tool cuts to the full depth of the teeth to be produced. Their tooth surfaces may be cut by simply imparting a cutting movement to a tool, while feeding it about the center of curvature of the tooth profile to be produced upon the gear being cut, until the tool has reached full-depth position. There are various other ways, too, in which they may be produced, as will appear hereinafter.

The invention may be applied equally to gears whose teeth are inclined to straight line elements of their pitch surfaces such as helical gears, skew bevel gears, etc., as well as to gears whose teeth extend along the straight line elements of their pitch surfaces, such as spur gears, straight bevels, etc. In the case of gears with helical or skew teeth, and broadly where the bottoms of the toothspaces of the gears are inclined to the straight line elements of the cylindrical or conical pitch surfaces of the gears, a motion about the axis of the tooth surface, which is to be produced, is preferably provided simultaneously with the motion of the tool along the tooth being cut so that the tool may follow the desired tooth bottom when it cuts the lowest part of the tooth flank. This additional motion does not affect the shape of the tooth surface proper but only the shape of the tooth bottom and does not therefore require the high accuracy of the usual timed relationship.

Ordinarily gears are cut according to the present invention in an intermittent indexing process. The invention, however, is not limited to use in such a process. If desired, the present invention may also be employed in the cutting of gears according to a continuous indexing process where the tool is reciprocated along the length of the gear tooth and the gear blank is rotated continuously in timed relation with the tool movement so that the tool cuts in a different tooth space of the blank on each cutting stroke. In such case, the desired tooth profile curvature may easily be obtained by producing a relative movement during cutting about the center of profile curvature of the tooth surface to be produced. No generating motion is required. The correcting motion now used where a crank driven tool is employed on a machine of the continuous indexing type, may be retained, if desired, however. This motion permits of avoiding producing teeth whose lengthwise curvature is of S shape and at the same time enables the two members of a gear pair to be cut so that they will have a suitable localized tooth bearing when they run in mesh.

One advantage of gears produced according to the present invention over gears having unmodified or rigid involute tooth profiles is the presence of a very desirable slight relief at the tops and bottoms of the tooth profiles. This minimizes the effect of manufacturing errors and provides a gear which will run quietly with its mate.

Another advantage is the reduction or elimination of undercut, which often exists especially on pinions of the involute system.

Still another asset is the better balance of the tooth profile curvature between the pinion and gear and the increased strength of the pinion teeth due to greater thickness at their bases.

In the case of tapered gears and straight spur gears, the tooth surfaces are preferably portions of circular conical or circular cylindrical surfaces. With such tooth surfaces, it is possible to make the gears so that they will mesh with a localized lengthwise tooth bearing, as well as the localized profile bearing referred to above. All that is required in order to obtain the lengthwise localization of bearing is to make the gears so that the straight elements of the mating tooth surfaces are disposed at a slight angle to one another as disclosed in my prior Patent No. 1,733,326 of Oct. 29, 1929.

The modification in which the tooth surfaces, that are produced on both members of a pair of tapered gears, are portions of convex circular cylindrical surfaces represents a special but important embodiment of this invention. This modification of the invention solves the heretofore difficult problem of devising a practical tooth shape for bevel and hypoid gears which will permit these gears to be milled and accurately ground with very simple means and without generating roll. In the case of gears made according to this embodiment of the invention, all that is required is to provide a milling cutter or a grinding wheel of circular arcuate profile curvature and feed the cutter or grinding wheel along the tooth surface, that is, along the axis of the cylindrical surface, while moving the tool about said axis to cause the tip of the tool to follow the desired tooth bottom. In many cases, moreover, the latter motion may be omitted. The present invention, then enables us to grind both spur and tapered gears very accurately with the most efficient grinding contact, namely, contact along the (circular) profile of the grinding wheel. This contact is analogous to the profile contact between grinding wheel and work obtained when grinding "Formate" spiral bevel gears according to the known method, and which has proved extremely successful in practice.

In the drawings:

Fig. 1 is an end elevational view of a pair of spur gears made according to this invention, or a profile sectional view of a pair of helical gears made according to the invention or a view of the developed back cones of a pair of bevel gears made according to this invention;

Fig. 2 is a corresponding view of a pair of gears of smaller pitch;

Fig. 3 is a diagrammatic view illustrating certain principles of construction involved in a pair of gears made according to this invention;

Figs. 8 and 9 are a fragmentary plan view and side elevation, respectively, illustrating the application of the method shown in Fig. 7 to the cutting of spur gears;

Figs. 10, 11 and 12 are diagrammatic fragmentary end elevational views, illustrating various ways of employing a pair of tools to cut simultaneously opposite side tooth surfaces of a gear by the process of the present invention;

Figs. 13 and 14 are fragmentary views taken at right angles to one another and illustrating one way of grinding a straight bevel gear, according to the present invention;

Figure 4:
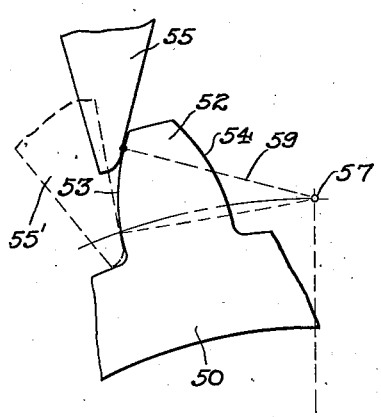
Fig. 4 is a diagrammatic view illustrating one method of cutting gears according to this invention and illustrating the cutting of one side of the teeth and Fig. 5 is a corresponding view showing the cutting of the opposite side of the teeth of the gear by the same method.

Reference will now be had to the drawings for a more detailed description of the invention. In Figs. 1 and 2, 25 and 26, respectively, denote the two members of a pair of gears made according to the present invention. As above stated, these views may be considered as the end views of a pair of spur gears made according to the invention, in which case 27 and 28 denote, respectively, the axes of these gears, or these views may be considered as the developed back cones of a pair of bevel gears made according to the invention, in which case 27 and 28 denote, respectively, the apices of the back cones. In the case of bevel gears, then, the spherical problem is reduced to a plane problem with 27 and 28 as parallel axes of rotation perpendicular to the plane of the drawings.

The gears are shown in a position where their mating tooth surfaces contact at a mean point P. The side surfaces 32 and 34 of the teeth 30 of the pinion 26 are of convex circular arcuate profile and the side surfaces 33 and 35 of the teeth 31 of the gear 25 are also of convex circular arcuate profile curvature. To transmit correct motion, the common profile normal 36 at point P must pass through the pitch point Q which is the contact point of the pitch circles 37 and 38 of the two gears, and this common profile normal must contain the centers 39 and 40, respectively, of the mating profiles 33 and 32, respectively.

The radius of profile curvature of the tooth surfaces of the pinion 26 or smaller member of the pair at mean point P is larger than the curvature radius of the profile of an involute tooth which has the same tooth normal at said mean point. 40, as stated, is the center of profile curvature of tooth surface 32 of a pinion produced according to this invention whereas 42 would be the curvature center of the profile of an involute tooth having the same tooth normal. The curvature center 42 of the involute profile is the projection of the axis or center 28 to the tooth normal 36. The difference between the radii of curvature of an involute tooth profile and of a tooth profile of a pinion made according to the present invention increases with an increase in the ratio of tooth numbers of a pair of gears.

On the gear, or larger member of the pair, 25, the relationship between the radius of profile curvature and the radius of curvature of an involute profile is the reverse of that which occurs on the pinion. The radius of tooth profile curvature on the gear is smaller than the curvature radius of the profile of a corresponding involute tooth. Thus, the center of curvature of the profile 33 in a gear made according to the present invention is at 39 whereas the curvature center of a corresponding involute profile would be at 43, which is the projection of the center or axis 27 of the gear 25 to the tooth normal 36.

The profile radius P—40 of the tooth surface 32 of the pinion is made up of a distance Q—40 and of distance Q—P. The profile radius P—39 of the gear is made up of the difference between the distance Q—39 and the distance Q—P. Let $r$ and $R$ denote, respectively, the pitch radii 28—Q and 27—Q of the two gears and let $\phi$ denote the pressure angle, that is, the inclination of the normal 36 to the tangent 45 of the pitch circles of the two gears at Q. Let $r'$ denote the distance Q—40 and let $R'$ denote the distance Q—39. It is seen that:

distance (42—40) = distance (Q—40) — distance (Q—42) = $r' - r \sin \phi$

Also: distance (28—42) = $r \cos \phi$.

When the pinion 26 turns on its center 28 through a small angle $\theta$, profile center 40 moves on a circle 46 about the center 28 to new position 40″. The total displacement of point 40 can be resolved into a component in the direction of normal 36 and into a component perpendicular to the normal. This is illustrated more clearly in Fig. 3, which is a diagrammatic view, showing on an enlarged scale the relationships illustrated in Fig. 1. 40—40′ and 40′—40″ are the two components. Inasmuch as the angle 28—42—40 is a right angle, the distances 40—40′ and 40′—40″ can readily be computed as:

dis.(40—40′) = dis.(42—40) — [dis.(42—40) · cos $\theta$ — dis.(28—42) sin $\theta$]
= $r \cos \phi \sin \theta + (r' - r \sin \phi)(1 - \cos \theta)$ and dis.(40′—40″) = dis.(42—40) sin $\theta$ + dis.(28—42) cos $\theta$ — dis.(28—42)
= $(r' - r \sin \phi) \sin \theta - r \cos \phi (1 - \cos \theta)$ The tangent of angle 40″—Q—40′, which angle is designated as $\delta$ is:

$$\tan \delta = \frac{\text{distance } (40'-40'')}{\text{distance } (Q-40')} = \frac{\text{distance } (40'-40'')}{\text{distance } (Q-40) - \text{distance } (40-40')}$$

or $$\tan \delta = \frac{(r' - r \sin \phi) \sin \theta - r \cos \phi (1 - \cos \theta)}{r' - [r \cos \phi \sin \theta + (r' - r \sin \phi)(1 - \cos \theta)]} \quad (1)$$

A similar equation can be derived for the gear:

distance (43—39) = $R \sin \phi - R'$ and
distance (27—43) = $R \cos \phi$

The component 39—39′ (Fig. 3) of the displacement of profile center 39 caused by turning the gear 25 on its center 27 through an angle $\theta'$ is:

distance (39—39′) = $(R \sin \phi - R') - [(R \sin \phi - R') \cos \theta' - R \cos \phi \sin \theta']$
= $R \cos \phi \sin \theta' + (R \sin \phi - R')(1 - \cos \theta')$ distance (39′—39″) = $(R \sin \phi - R') \sin \theta' + R \cos \phi \cos \theta' - R \cos \phi$
= $(R \sin \phi - R') \sin \theta' - R \cos \phi (1 - \cos \theta')$ $$\tan \angle (39'-Q-39'') = \tan \Delta = \frac{\text{distance }(39'-39'')}{\text{distance }(Q-39) + \text{distance }(39-39')}$$

$$= \frac{(R \sin \phi - R') \sin \theta' - R \cos \phi (1 - \cos \theta')}{R' + R \cos \phi \sin \theta' + (R \sin \phi - R')(1 - \cos \theta')} \quad (2)$$

The angles $\theta$ and $\theta'$, respectively, through which the pinion and gear turn are inversely proportional to the pitch radii $r$ and $R$ of the pair so that, $$\theta' = \frac{r}{R} \cdot \theta$$

The tooth profiles of a pair of gears produced according to this invention will fulfill the requirements of true uniform motion when the tooth normal at the point of contact of the mating tooth surfaces continues to pass through pitch point Q in any position of rotation of the gears or also when the normal drawn to the pitch point Q perpendicular to the tooth profile of the pinion coincides with the normal drawn through Q perpendicular to the mating tooth profile of the gear. This then means that for angles of rotation $\theta$ and $$\theta' = \frac{r}{R} \theta$$

the angle $\delta$ should be equal to $\Delta$.

If $\theta$ denotes the arc of the angle, that is the angle in radians, we have $$\sin \theta = \theta - \frac{\theta^3}{1 \cdot 2 \cdot 3} + \frac{\theta^5}{1 \cdot 2 \cdot 3 \cdot 4 \cdot 5} - \text{etc.}$$

or for small angles $\theta$, then $\sin \theta = \theta$ and $$(1 - \cos \theta) = \frac{\theta^2}{2}$$

Likewise for small angles, $$\sin \theta' = \frac{r}{R} \cdot \theta$$

and $$(1 - \cos \theta') = \frac{1}{2}\left(\frac{r}{R}\theta\right)^2$$

Equations 1 and 2 then become:

$$\tan \delta = \frac{(r' - r \sin \phi) \theta - r \cos \phi \frac{\theta^2}{2}}{r' - r \cos \phi \, \theta - (r' - r \sin \phi)\frac{\theta^2}{2}} \quad (1A)$$

$$\tan \Delta = \frac{(R \sin \phi - R')\frac{r}{R}\theta - R \cos \phi \left[\frac{1}{2}\left(\frac{r}{R}\theta\right)^2\right]}{R' + R \cos \phi \frac{r}{R}\theta + (R \sin \phi - R')\left[\frac{1}{2}\left(\frac{r}{R}\theta\right)^2\right]} \quad (2A)$$

We have now, $\tan \delta = \tan \Delta$.

If we now multiply both sides of the equation by the two denominators, we obtain, $$\left[(r'-r\sin\phi)\theta-r\cos\phi\frac{\theta^2}{2}\right]\left[R'+r\cos\phi\theta+(R\sin\phi-R')\tfrac{1}{2}\left(\frac{r}{R}\theta\right)^2\right]=$$

$$\left[(R\sin\phi-R')\frac{r}{R}\theta-R\cos\phi\tfrac{1}{2}\left(\frac{r}{R}\theta\right)^2\right]\left[r'-r\cos\phi\theta-(r'-r\sin\phi)\frac{\theta^2}{2}\right]$$

If we neglect terms higher than the second order in $\theta$, we obtain:

$$(r'-r\sin\phi)R'\theta+\frac{\theta^2}{2}[2r\cos\phi(r'-r\sin\phi)-rR'\cos\phi]=$$

$$(R\sin\phi-R')r'\frac{r}{R}\theta+\frac{\theta^2}{2}\Big[-2r\cos\phi(R\sin\phi-R')\frac{r}{R}-$$

$$R\cos\phi\left(\frac{r}{R}\right)^2 r'\Big]$$

and $$\theta\left[r'R'-\sin\phi\cdot rR'-\sin\phi rr'+r'R'\cdot\frac{r}{R}\right]+$$

$$\frac{\theta^2}{2}\Big[2r\cos\phi\Big\{(r'-r\sin\phi)+R\frac{r}{R}\sin\phi-R'\frac{r}{R}\Big\}-$$

$$rR'\cos\phi+\cos\phi R\left(\frac{r}{R}\right)^2\cdot r'\Big]=0$$

Let us call the first term within the bracket $C'$ and the second term $C''$. The above equation then becomes:

$$\theta C'+\frac{\theta^2}{2}C''=0$$

Both $C'$ and $C''$ must be zero to fulfill this equation for all small angles of $\theta$. An approximation is obtained when only $C'$ is zero and $C''$ is small or when $C'$ is small and $C''$ is zero, or when both $C'$ and $C''$ are small. When only $C'$ is zero, this means that the tooth profiles are correct for uniform motion as far as radii of curvature of the profiles at mean point P is concerned. The tooth tangent and profile curvature are right, or in other words the profiles are correct up to the second order.

If now $C''$ is also zero, then the profiles are corrected one step further, namely, up to the third order. As will be readily understood by those familiar with infinitesimal quantities, the departure of such profiles from profiles giving a mathematically uniform motion is in the same direction at both profile ends. They have either more stock at the top and bottom of the profiles or they have less stock at the top and bottom of the profiles. I have found that it can readily be demonstrated, that profiles of circular arcuate curvature, such as are proposed with the present invention, have slightly less stock at the tops and bottoms of the teeth, that is, they are slightly relieved at the tops and bottoms of the teeth. This is just what is desired in practice. In fact, this modification is so desirable that in practice involute teeth and other teeth designed to transmit uniform motion are commonly modified to have relief at the tops and bottoms of the teeth although such modification, in the case of such gears adds to the cost of the tools required to produce them.

If we let $C'$=zero, then the following equation is obtained which results from dividing all the factors by $(r'R')$:

$$1+\frac{r}{R}-\sin\phi\cdot r\left[\frac{1}{r'}+\frac{1}{R'}\right]=0$$

and further, $$\sin\phi\left[\frac{1}{r'}+\frac{1}{R'}\right]=\frac{1}{r}+\frac{1}{R} \qquad (3)$$

Where $C''$=zero and the factors are divided by $(r\cos\phi)$, then:

$$2\left\{r'-r\sin\phi+r\sin\phi-R'\frac{r}{R}\right\}-R'+\frac{r}{R}\cdot r'=0$$

If we multiply all the factors by $R$, we obtain:

$$r'(2R+r)=R'(R+2r) \qquad (4)$$

and $$\frac{1}{R'}=\frac{1}{r'}\cdot\frac{R+2r}{2R+r}$$

and $$\frac{1}{r'}=\frac{1}{R'}\cdot\frac{2R+r}{R+2r}$$

When we substitute the above terms for $$\frac{1}{R'}$$

and $$\frac{1}{r'}$$

in Equation 3, we obtain:

$$\sin\phi\left[\frac{1}{r'}+\frac{1}{r'}\cdot\frac{R+2r}{2R+r}\right]=\frac{1}{r}+\frac{1}{R}$$

then:

$$\frac{rR}{r'}\sin\phi\left(1+\frac{R+2r}{2R+r}\right)=\frac{rR}{r'}\sin\phi\cdot\frac{2R+r+R+2r}{2R+r}=R+r$$

and $$\frac{rR}{r'}\sin\phi\cdot\frac{3}{2R+r}=1$$

whence, $$\left.\begin{array}{c}r'=\dfrac{3rR\sin\phi}{2R+r}\\[4pt] R'=\dfrac{3rR\sin\phi}{R+2r}\end{array}\right\} \qquad (5)$$

At a 1 to 4 ratio of the radii $r$ and $R$ of the pitch circles of the mating gears, the ratio of $$\frac{r'}{R'}$$

is according to Equation 4:

$$\frac{R+2r}{2R+r}=\frac{4r+2r}{8r+r}=\frac{6}{9}=\frac{2}{3}$$

whereas in the involute system the corresponding radii of curvature of the tooth surfaces of gear and pinion are in the proportion of ¼.

The quantities $r'$ and $R'$ are independent of the distance Q—P. In other words, the locations of the profile centers 40 and 39 do not depend on the position of the mean point P along the normal 36. In fact, if desired, P may be so located along the normal 36 that equal profile radii may be obtained on the mating tooth surfaces of gear and pinion. The tooth thicknesses of gear and pinion may then be balanced by providing a suitably long addendum on the pinion and a correspondingly short addendum on the gear.

Fig. 2 illustrates a pair of gears 25' and 26' which are of finer pitch than the gears shown in Fig. 1, but which are of otherwise equal dimensions with the gears shown in Fig. 1. Equal addenda are provided on both gear and pinion in the pair shown in Fig. 2. The mean point of contacts between the mating tooth surfaces, which is at P in the pair shown in Fig. 1, is preferably assumed at pitch point Q in the pair shown in Fig. 2. It should be noted that the centers of profile curvature 40 and 39 have the same positions in both figures.

Bevel gears made according to this invention are treated according to the established practice in treating and analyzing bevel gears, that is, like spur gears by using the back cone radii of the bevel gears as the radii r and R. Accordingly, the back cone radii are first determined as usual and the locations of the centers of curvature of the tooth profiles of the bevel gears and the radii of curvature of these profiles are determined with Formulas 5.

The angles $l$ and $L$ included between the axis of the conical tooth surface of pinion or gear, respectively, and the straight line of contact between the conical pitch surfaces of the two gears when they are in mesh is:

$$\tan l = \frac{r'}{A}$$

$$\tan L = \frac{R'}{A}$$

where A denotes the cone distance, that is, the distance from the apex of gear or pinion to the mean point of contact.

I have made a direct analysis of the spherical problem encountered in bevel gears and have confirmed the results given above. The direct spherical analysis is more involved and a great deal longer than the plane one and is omitted here inasmuch as it merely confirms an expected result.

Lengthwise mismatch or localization of tooth bearing may be obtained in a pair of gears made according to this invention by the method described generally in my prior Patent No. 1,733,326 above mentioned. The tooth surface produced on the two members of the pair have straight line elements which do not coincide but which include a slight angle with one another. The gears so produced will have pressure angles which change from one end of the teeth to the other, but this is no drawback.

When the present invention is applied to the production of gears having helical teeth, the circular tooth profiles may be determined either in the transverse (peripheral) section of the gears or in a section normal to the lengthwise direction of the teeth. The pressure angle $\phi$ used in the formulas already given will, then, be the transverse or the normal pressure angle, respectively, in accordance with the plane in which it is desired to have the circular arcuate profile curvature. The radii r and R are the actual pitch radii of the cylindrical gears where the transverse section is used and the curvature radii of the normal sections through the pitch surfaces when the normal sections are used.

All known methods of manufacturing gears may be used in making gears according to the present invention. Milling or grinding with cutters or grinding wheels of circular profile is particularly simple when the profile of the tooth surface to be produced is constant along the length of the tooth surface and need not be explained further here. It will be obvious that when a cutter or grinding wheel of this type is employed, the desired constant tooth profile curvature can be produced on the gear being cut or ground by simple movement of the cutter along the gear tooth.

Figure 5:
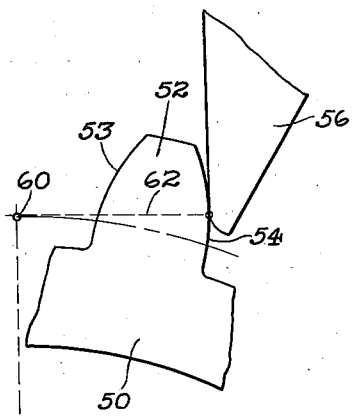

Figs. 4 and 5 illustrate the application of the planing method of cutting to the production of gears according to the present invention. Either spur or bevel gears may be cut in this way. The two sides of the teeth of the gear are cut separately.

50 designates the gear to be cut and 51 is its axis. 52 is a tooth of the gear and 53 and 54 are the opposite sides of the tooth. 55 is the planing tool for cutting one side 53 of the teeth and 56 is the planing tool for cutting the opposite side 54 of the teeth. These tools have straight-sided cutting edges, but may be rounded, as shown, at their tips according to conventional construction.

The tooth surface 53 to be cut is of circular arcuate profile shape and has its center at 57 and a radius of curvature 59. The opposite side tooth surface 54 has a center of curvature at 60 and a radius of curvature 62.

In cutting the tooth side 53, the gear 50 is held stationary on its axis 51 and the planing tool 55 is reciprocated back and forth along the length of the gear tooth while a slow relative feed movement is produced between the tool and the gear blank about the axis 57 of profile curvature of the tooth surface to be cut. In Fig. 4, this feed movement is illustrated as applied to the tool so that during the cutting operation, the tool moves from the full line position indicated at 55 to the dotted line position indicated at 55'. When the tool has reached full depth position, the tooth side 53 is completed. The tool then is swung back about the axis 57 until it clears the blank and then the blank is indexed. After all of the sides 53 of the teeth of the blank have been cut, the planing machine is set up for cutting the other sides 54 of the teeth and these tooth sides are then cut with the tool 56 in the same way as the sides 53 were cut, namely by reciprocation of the tool along the length of the gear tooth and relative feed of the tool about the profile center or axis 60.

Figure 6:
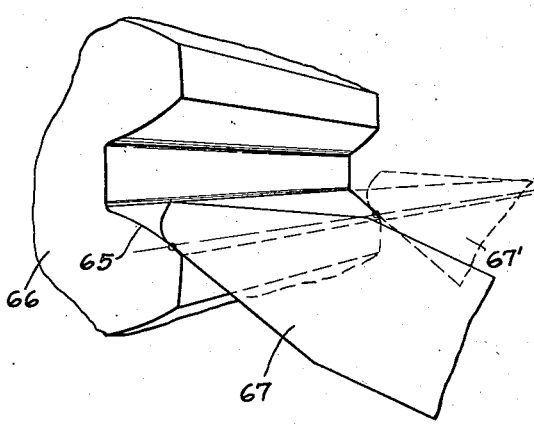
Fig. 6 is a diagrammatic view further illustrative of this method as applied to the production of bevel gears.

In planing the teeth of either a spur or a bevel gear, the planing tool is, of course, reciprocated in the direction of a straight line element of the tooth surface being produced. For bevel gears, the straight line elements of the tooth surfaces ordinarily intersect in the cone apex of the gear. Thus, as shown in Fig. 6, in planing the tooth surface 65 of the bevel gear 66, the planing tool 67 will ordinarily be reciprocated along lines 68 which intersect in the gear apex 69. 70 is an element of the tooth surface at the top of the tooth profile and 71 is an element of the tooth surface at the root of the tooth profile. The tool is shown in full lines at 67 at one end of its stroke and in dotted lines at 67' at the opposite end of the cutting stroke. By reciprocating the planing tools along lines differently inclined to the pitch surfaces of the mating gears, however, in a manner similar to that described in my patent above mentioned, mating tooth surfaces can be produced on a pair of gears which will mismatch one another and so a localization of tooth bearing may be obtained.

The planing process of cutting gears has the advantage of extreme simplicity and a very simple form of gear cutting machine may be employed for this purpose. The planing method is one of the oldest methods of cutting gears, and planing machines, such as the machine shown in the Gleason Patent No. 678,337 of July 9, 1901, are still attractive on account of their outstanding simplicity. The drawbacks of these machines have been the requirement for a templet to control the tooth shape and the fact that the cutting has had to be done with a pointed tool or a tool with a small round at its tip. Templets are, of course, difficult to produce with accuracy and the cutting action itself with the pointed tool gives a poor tooth surface finsh. Moreover, it is not very accurate and the cutting process with such a tool is relatively slow.

With the present invention, however, the drawbacks of the planing process are all overcome. The machine, in fact, can be made even simpler than prior types of gear planing machines, for to cut the gears of the present invention, the reciprocating tool needs only to be fed about a fixed axis, the axis of profile curvature of the tooth surface, whereas heretofore it had to be guided by a templet. In addition, the tooth profiles of the gears of this invention can be cut with tools having straight cutting edges and in this way the speed and accuracy of a generating process can be obtained. It is possible to do even more than this. By using a planing tool that has a concave cutting edge, a better tooth surface can be obtained than in a generating process or the same finish may be secured but in a shorter time. The use of tools having concave cutting edges is illustrated in Figs. 7 to 9 inclusive.

Figure 7:
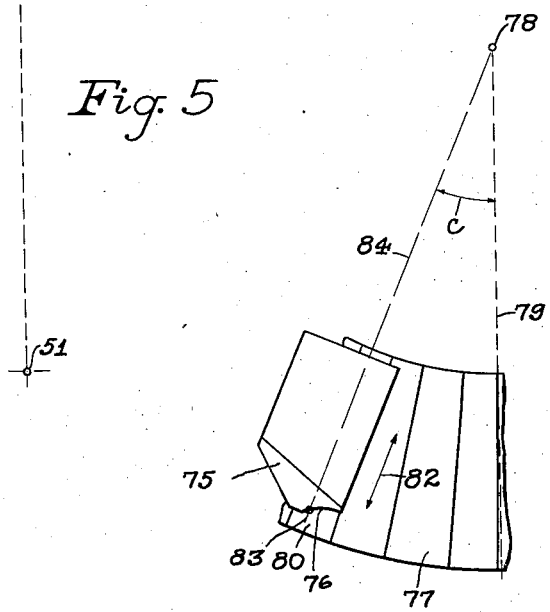
Fig. 7 is a plan view illustrating the method of cutting a bevel gear according to a slightly different embodiment of the invention.

Fig. 7 shows the cutting of one side surface of a tooth of a bevel gear with such a tool. The tool is denoted at 75 and it has a concave cutting edge 76. 77 denotes the gear and 78 is its apex. 79 is the axis of the conical tooth surface 80 which is to be produced. In cutting the gear, the tool is reciprocated in direction 82 so that its point of contact 83 moves along a line 84 radial of the gear apex 78, and simultaneously with the reciprocating movement, the tool is fed gradually about the axis 79 into full depth position. The tool path 84 includes an angle c with the axis 79 of the tooth surface being cut. This angle varies, of course, for different gears, but a machine may be made to cut different gears simply by providing an adjustment of the tool about gear apex 78.

The use of a planing tool having a concave cutting edge is further illustrated in Figs. 8 and 9 in connection with the cutting of a spur gear. Here 85 denotes the gear to be cut and 86 is its axis. 87 is the cutting tool and 88 denotes the concave cutting edge of this tool. 89 is the tooth surface which is to be cut with the tool 87. The tool is shown in contact with this tooth surface at the point 90. The axis of profile curvature of the tooth surface 89 is denoted at 92. The radius of curvature 90—93 of the cutting edge 88 of the tool 87 is larger than the radius 90—92 of profile curvature of the tooth surface 89 to be cut. It will be evident, however, that the concave cutting edge of this tool will follow the convex tooth profile 89 better than a straight sided cutting tool because the concave cutting edge differs less from the tooth profile to be produced. Hence, with a tool having a concave cutting edge, a better tooth surface finish may be obtained.

In cutting the gear 85, the tool is reciprocated, as before, in the direction of tooth length, here denoted at 95 and is fed about the axis 92 of profile curvature of the teeth. Here the direction 95 is parallel to the axis 92 and, for spur gears, is also parallel to the gear axis 86. The tooth surface cut on the gear, then, is a cylindrical surface whose axis is at 92. After one tooth surface of the gear has been cut, the tool is withdrawn and the blank indexed. After all the tooth surfaces at one side of the teeth have been cut, the opposite sides of the teeth may be cut with a tool having a cutting edge suitable for cutting such sides.

In a helical gear, the teeth are, of course, inclined to the gear axis. In Fig. 8, we have shown diagrammatically how a helical gear may be produced. The teeth of this gear are assumed to extend in the direction 95 and the axis of the gear is assumed to have the position indicated by the dotted line 96. The cutting motion employed in cutting a helical gear differs from that used for cutting a spur gear because of the inclination of the teeth of the helical gear to its axis. The cutting motion, for helical gears, should be a helicoidal motion, as denoted by the arrow 97, about the axis 96 of the gear. This means that the tool must be reciprocated in the direction of the axis 96 while the gear is being turned about that axis or that the tool may be held stationary while the work is being reciprocated in the direction of and rotated about the axis 96. In addition to this helicoidal motion about axis 96, a relative feed movement is produced between the tool and gear about axis 92 to produce the desired profile curvature of the gear tooth, as before.

In Figs. 10 to 12 inclusive, I have illustrated various ways of employing two tools to cut spur, helical and tapered gears according to this invention. In Fig. 10, 100 denotes the gear to be cut and 101 and 102 are the tools which are employed to cut the tooth surfaces of this gear. The tools here shown have concave cutting edges 103 and 104, respectively, whose centers of curvature are at 105 and 106, respectively, and whose radii of curvature 107—105 and 108—106, respectively, are greater than the radii of curvature 107—109 and 108—110, respectively, of the tooth surfaces 111 and 112, respectively, which the tools are to cut. In Fig. 10, the two tools are shown adjusted to operate on opposite sides 111 and 112 of the same tooth space. Here the two tools are arranged so as to cut in opposite directions, one tool being slightly withdrawn for clearance while the other one is cutting. One tool cuts on the stroke in one direction and the other on the return stroke and the tooth profiles are produced, as before, by feeding the reciprocating tools about the axes 109 and 110, respectively, of profile curvature of the tooth surfaces to be produced. The gear is held stationary on its axis during cutting and when a pair of tooth surfaces have been completed, the tools are withdrawn from engagement with the blank and the blank indexed.

Fig. 11 shows a set-up in which the two tools operate in different tooth spaces of the gear blank being cut. The blank is here denoted at 115 and the tools at 116 and 117, respectively. Here the tools have straight cutting edges 118 and 119, respectively. With such tools, the feed motion is preferably imparted to the gear. It consists of a motion such that the two tooth sides 120 and 121, which are to be cut, will remain in contact with the stationary plane surfaces 118 and 119 represented by the tool throughout the whole of the feed movement. This feed motion may be obtained by using cams and abutments. The cams will have cylindrical or conical cam surfaces, depending upon whether spur or tapered gears are being cut, whose centers coincide with the axes 122 and 123, respectively, of profile curvature of the tooth surfaces 120 and 121 to be produced. The abutments will have plane surfaces representing the planes 118 and 119 or planes parallel thereto. The cams will be secured to the gear in such way as to bear against the abutments. By rocking the gear about its axis, then, as the tools are reciprocated back and forth in the planes 118 and 119, respectively, tooth surfaces 120 and 121 of the desired profile curvature can be produced on the gear blank. When a pair of tooth surfaces has been completed, the tools are withdrawn from engagement with the blank and the blank indexed. Instead of reciprocating tools, plane-sided grinding wheels may be used, as will readily be understood.

The motion obtained in cutting a gear by the method illustrated in Fig. 11 is actually a rolling motion and it can readily be demonstrated that on a spur gear, the motion is as if a circle of the gear would roll on a stationary circle twice its diameter. The rolling circle of the gear passes through the centers 122 and 123 of the profile curvature and the point 125 which is the point of intersection of the tooth normals.

In Fig. 12, I have illustrated particularly a method of finish-cutting with two planing tools. The gear is here designated at 130 and the tools at 131 and 132. The tools have concave cutting edges 133 and 134, respectively. The tools are here shown in the positions which they occupy at the start of the finishing cut. It is assumed that the final finish contours of the gear teeth are then in the positions shown in dotted lines so that both tools clear the work. As the tools reciprocate back and forth in the positions shown, the blank is first turned slowly about its axis 135 toward the tool 131 until it reaches the position shown in full lines. In this position, the point 136 at the root of the tooth profile 137 is formed. The blank is now held stationary on its axis and the tool feed movement starts. In the instances shown, the tooth profiles 137 and 138 are both curved about a common axis 139. The feed movement of the tools is, then, of course, about this axis. This feed movement is such that as the tool 131 moves outwardly to finish cut the profile 137 from the root to the tip thereof, the tool 132 will move inwardly to finish-cut the profile 138 from the tip to the root thereof. At the end of the feed movement, the tool 132 will have reached full-depth position and the tool 131 will have cleared the work. The reciprocating movements of the tools are then stopped, the tools are returned to starting position and the blank is indexed. The indexing motion is so retarded that the teeth of the blank, after indexing, will be in a position corresponding to that shown in dotted lines so that after the tools start to cut on new tooth surfaces of the blank, the first movement will again be a slow turning motion of the blank about its axis from the dotted line to the full line position.

The method of cutting illustrated in Fig. 12 requires a special tooth design since the axis 139 of profile curvature of the tooth surfaces must be on the center line of a tooth or of a tooth space of the gear. This requirement is easily met, however, by standardizing on gears of suitable tooth numbers.

It will be obvious that the various modifications of the invention above described may be practiced by using milling cutters or grinding wheels in place of the planing tools. For the planing tools having concave cutting edges, then, milling cutters or grinding wheels having concave cutting profiles may be employed and for the planing tools having straight cutting edges, milling cutters or grinding wheels may be employed whose active surfaces are plane surfaces perpendicular to the axes of the cutters or wheels.

Figs. 13 and 14 illustrate a further application of the invention to the grinding or milling of gears with a plane-sided cutter or wheel of large diameter. In the drawings, I have shown a grinding wheel W whose axis is at 140 and which has a plane grinding surface 141. Here the diameter of the grinding wheel is so large that no movement along the length of the gear tooth is required. The feed movement about the axis 142 of the conical or cylindrical tooth surface 143 which is to be ground is in this instance preferably imparted to the gear blank 145. Two positions of the gear tooth are shown in full lines and in dotted lines, respectively, at the beginning and near the end of the feed movement about axis 142. In the position shown in full lines, the axis of the gear is at 146. During grinding, the gear is swung about the axis 142, which is perpendicular to the drawing plane, to and beyond the position shown in dotted lines. The gear axis moves, in this swinging motion on circle 147 to and beyond position 146''.

In order to distribute the wear on the grinding wheel more evenly and to spread it over a larger area, the wheel may be moved in the plane of its active surface during the feed movement. Thus, it may be moved from the full line position shown to the dotted line position denoted at W' in Fig. 13. This movement may be timed to movement of the gear about axis 142.

Where there is considerable stock to be ground off a tooth surface, a tooth may be fed back and forth over the grinding wheel several times before it is indexed and, if this is done, the gear may be advanced step by step into the grinding wheel after each feed movement about the axis 142, by slight rotation of the gear on its own axis 146. This advances the tooth surface to be ground step by step into the wheel to permit step by step grinding off of the desired amount of stock. After a tooth surface has been ground, the gear may be swung clear of the wheel and indexed.

Figure 15:
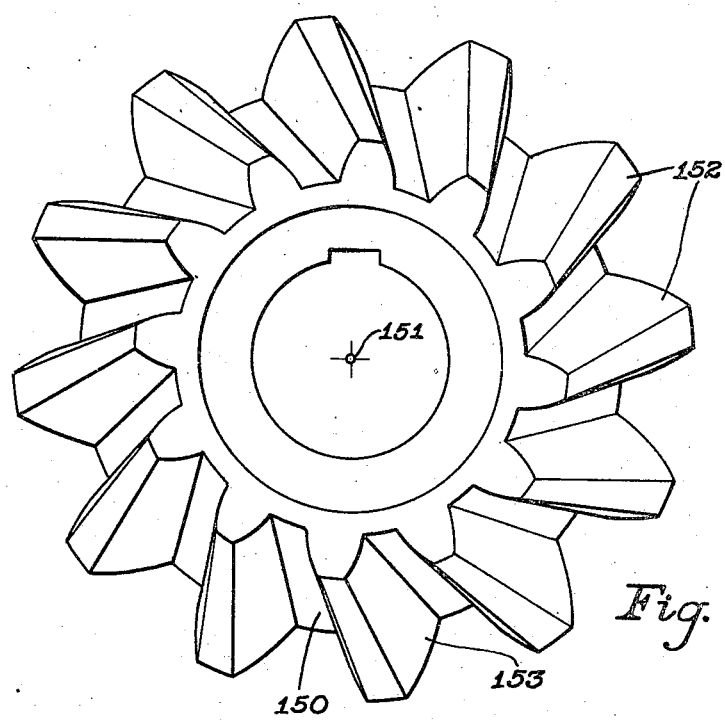
Fig. 15 is a plan view of a skew bevel gear made according to this invention and Fig. 16 is a view on an enlarged scale of one of the teeth of this gear and illustrating diagrammatically certain of the principles of this invention.
Figure 16:
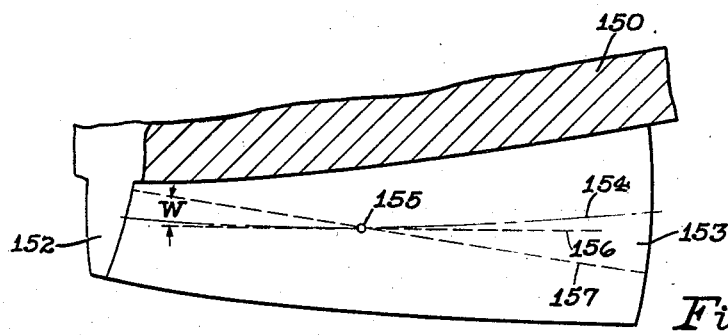
Figure 17:
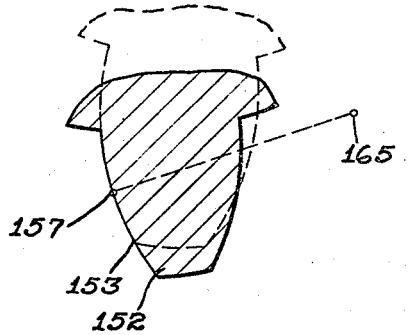
Fig. 17 is a diagrammatic view showing a section taken midway the length of the tooth of Fig. 16 and in dotted lines an end view of the tooth at the large end thereof.

Figs. 15 to 17 inclusive illustrate an application of the invention to skew bevel gears. In Fig. 15, I have shown a skew bevel gear 150. The axis of this gear is denoted at 151 and its teeth are designated at 152. The opposite sides of the teeth of this gear are of circular arcuate curvature and are preferably cylindrical surfaces so that they may readily be milled or ground.

In Fig. 16, a tooth 152 of the gear is shown on an enlarged scale. 154 denotes the pitch line on side surface 153 of the tooth and 155 is a mean point in the tooth surface. 156 denotes a tangent to the pitch line 154 at mean point 155. 157 denotes the normal projection to the tooth surface of the instantaneous axis of rotation of the gear when in mesh with its mate. 157 is also the line of instantaneous contact between the mating tooth surfaces of a pair of fully matched skew bevel gears and in principle could be made a straight line element of the mating tooth surfaces. Preferably, however, a pair of gears made according to this invention are provided with a slight lengthwise mismatch or localization of tooth bearing in accordance with the principles of my prior patent already mentioned. When the gears are made with this mismatch, the tooth surfaces will have pressure angles changing along pitch line 154 from the large to the small end of the teeth.

Figure 19:
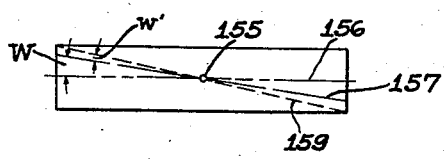
Figs. 19 to 21 inclusive are diagrammatic views illustrative of the principles of the invention, as applied to the embodiment illustrated in Figs. 15 to 17 inclusive.
Figure 20:
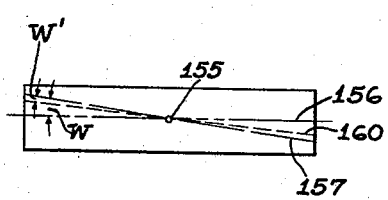

This change in pressure angle is illustrated diagrammatically in Figs. 19 and 20, which are views of the tangential planes to the surfaces of the mating gears at mean point of contact 155. Fig. 19 shows the tangential plane for the tooth surface of the gear shown in Fig. 16 and Fig. 20 is the tangential plane of the mating tooth surface of the gear which meshes with gear 150.

To obtain the desired localization of lengthwise tooth bearing, the tooth surfaces of the gear 150 are so cut by lengthwise movement of the cutting tool that a straight line element 159 of a tooth surface is inclined to the pitch line tangent 156 at an angle which is greater by the angle $w'$ than the angle $W$ of inclination of the instantaneous axis 157 to the tangent 156. The mating gear is then cut so that a straight line element 160 of one of its tooth surfaces is inclined to the tangent 156 at an angle which is less than the angle $W$ by an angle $W'$ which may or may not, as desired, be equal to the angle $w'$.

Figure 21:
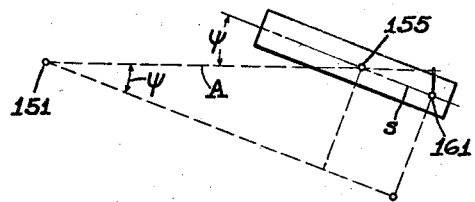

The rate of increase in pressure angle from the large to the small end of the gear teeth may readily be computed by known means. Let $\phi$ denote the pressure angle at the mean cone distance $A$ (distance 151—155, $\psi$ denote the spiral angle or lengthwise inclination of the teeth of the gear at mean cone distance $A$ and let $\phi'$ and $\psi'$, respectively, denote the pressure angle and spiral angle at any other cone distance 151—161 (Fig. 21). Let $\gamma$ be the pitch angle of the gear 150 and $\Gamma$ be the pitch angle of the mating gear.

The curvature radii $r_1$ and $r_2$ of the normal sections of involute teeth are known to be at the pitch lines:

$$r_1 = \frac{A' \sin \phi'}{\cos^2 \psi'} \cdot \tan \gamma \quad \text{and} \quad r_2 = \frac{A' \sin \phi'}{\cos^2 \psi'} \tan \Gamma$$

The sum of the reciprocals is:

$$\frac{1}{r_1} + \frac{1}{r_2} = \frac{\cos^2 \psi'}{A' \sin \phi'} (\cotan.\gamma + \cotan.\Gamma)$$

This sum of the reciprocals of the curvature radii of a normal section is independent of the nature of the tooth, as is well known in the art, and applies also to non-involute teeth. A constant sum and constant individual curvature radii result when the factor $$\frac{\cos^2 \psi'}{A' \sin \phi'}$$

is constant all along the length of the gear teeth. The tooth surfaces may then be made cylindrical surfaces.

The rate of change of $$\frac{\cos^2 \psi'}{A' \sin \phi'}$$

and also of $$\frac{A' \sin \phi'}{\cos^2 \psi'}$$

should be zero for an infinitesimal distance $s$, such as the distance 155—161 (Fig. 21). We then have: $\phi' = \phi + \delta\phi$ where $\delta\phi = -C.s$ in arc or radians and where $C$ is a constant which may be determined in known manner from the showing of Fig. 19.

Further:

$$\sin \phi' = \sin \phi + \cos \phi.\delta\phi$$
$$= \sin \phi - C.s.\cos \phi$$

Now from Fig. 21, it will be seen that, $$A' = A + s \cos \psi$$

and $$A' \cos \psi' = A \cos \psi + s$$

Then:

$$\cos \psi' = \frac{A \cos \psi + s}{A'} = \frac{A \cos \psi + s}{A + s \cos \psi}$$

or $$\frac{A' \sin \phi'}{\cos^2 \psi'} =$$

$$(A + s \cos \psi)(\sin \phi - C.s \cos \phi)\frac{(A + s \cos \psi)^2}{(A \cos \psi + s)^2}$$

If we neglect terms of second and higher order in $s$, we have:

$$\frac{A' \sin \phi'}{\cos^2 \psi'} = \frac{(A + s \cos \psi)^3}{(A \cos \psi + s)^2}(\sin \phi - C.s.\cos \phi)$$

$$= \frac{(A + s.\cos \psi)^3}{(A.\cos \psi)^2} \cdot \frac{\sin \phi - C.s.\cos \phi}{\left(1 + \frac{s}{A \cos \psi}\right)^2}$$

$$\frac{(A + 3s \cos \psi)}{\cos^2 \psi}(\sin \phi - C.s.\cos \phi)\left(1 - 2\frac{s}{A \cos \psi}\right)$$

$$= \frac{A \sin \phi}{\cos^2 \psi}\left(1 - 2\frac{s}{A \cos \psi}\right) - \frac{A}{\cos^2 \psi}C.s.\cos \phi +$$

$$\frac{3s \cos \psi \sin \phi}{\cos^2 \psi}$$

$$= \frac{A \sin \phi}{\cos^2 \psi} + \frac{s}{\cos \psi}\left(-\frac{2 \sin \phi}{\cos^2 \psi} - \frac{A.c.\cos \phi}{\cos \psi} + 3 \sin \phi\right)$$

Evidently the term within the parenthesis must be zero since $$\frac{A \sin \phi}{\cos^2 \psi}$$

is a constant. Hence:

$$3 \sin \phi - 2 \sin \phi(1 + \tan^2 \psi) - \frac{A.C.\cos \phi}{\cos \psi} = 0$$

or $$\sin \phi(1 - 2 \tan^2 \psi) - \frac{A \cos \phi}{\cos \psi} \cdot C = 0$$

When the above relationship is fulfilled, we may use cylindrical tooth surfaces on the mating skew bevel gears. The above formula gives the constant $C$ in terms of the spiral angle or tooth inclination $\psi$ and the pressure angle $\phi$ or it permits of computing the spiral angle or tooth inclination $\psi$ when $\phi$ and $C$ have been assumed.

In Fig. 17, I have shown a section taken midway of the skew gear tooth 152 and superimposed upon a dotted line view of the large end of the tooth. The axis of the cylindrical side surface 153 of the tooth is indicated at 165. Since the straight line element 157 of the tooth surface is inclined to the pitch surface of the gear, the axis 165 will also be inclined to the pitch line and at the angle required to produce a tooth surface having the desired localization of tooth bearing. This construction is illustrated in Fig. 17, for it will be seen that the top of the tooth at the middle of the tooth extends further above the straight line element 157 of the tooth surface than does the top of the tooth at the large end of the tooth.

Figure 18:
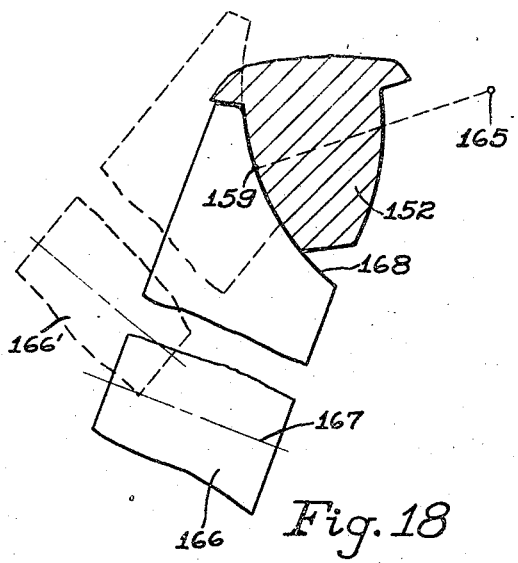
Fig. 18 is a diagrammatic view illustrating one method of cutting or grinding the teeth of a skew bevel gear such as shown in Figs. 15 to 17 inclusive.

Skew bevel gears made according to this invention may be produced in various ways. One prime advantage of making such gears with cylindrical side tooth surfaces is that they can readily be ground with a formed milling cutter or grinding wheel. This is illustrated in Fig. 18. The milling cutter or grinding wheel is denoted at 166 and its axis at 167. The cutter or grinding wheel is provided with a concave operating surface 168 whose radius 159—165 corresponds to the radius of the cylindrical tooth surface to be ground. In cutting or grinding the gear, the cutter or grinding wheel is rotated on its axis 167 and moved longitudinally of the tooth surface and simultaneously therewith is rocked about the axis 165 so that, as it moves from the small to the large end of the tooth, it will cut or grind the tooth to the desired depth. In Fig. 18, two positions of the cutter or grinding wheel are shown. The full line position is the position which the cutter or wheel occupies when it is grinding midway the length of the gear tooth. The dotted line position, denoted at 166', is the position which the cutter or grinding wheel occupies when grinding at the large end of the tooth, that is, the position corresponding to the dotted line position of the tooth shown in Fig. 17. As before, when a tooth surface has been ground, the cutter or wheel is withdrawn from engagement with the blank and the gear is indexed and when one side of all the teeth of the cutter have been ground, the wheel or cutter and the blank can be readjusted to permit grinding of the opposite sides of the teeth.

In another important modification of the invention, tapered gears are formed with skew teeth which have lengthwise mismatch or localization of tooth bearing and which have conical side tooth surfaces whose axes are so located that the cone element, which is at the lowest point on the side of the tooth surface, follows the direction of the tooth bottom. The tooth surfaces of such a gear can be produced without rocking the cutter or grinding wheel about the tooth surface axis as it moves from one end of the tooth to the other and as is required in the process illustrated in Fig. 18. In the modification of the invention here referred to, the mean element of the conical tooth surface is disposed to follow the pitch line tangent 156 (Figs. 16 and 19) more closely than the line 157. Angles $w'$ and $W'$ (Figs. 19 and 20) are then assumed to be negative and of the same order as W. The tooth surface produced on a gear made in this way has pressure angles decreasing from the large end to the small end of the tooth and the spiral angle or inclination of the teeth is moderate, being 10° or 12°, at most. This design of teeth for bevel gears lends itself especially to the production of the gears in a planing process. The tool, whose cutting edge may be either straight or concave is reciprocated along the length of the tooth and is fed relative to the gear blank about the axis of the conical surface which it is desired to produce on the tooth. This axis is, of course, inclined to the direction of longitudinal movement of the tool at the cone angle of the tooth surface.

While the invention has been described specifically with reference to gears whose tooth profiles are of circular arcuate curvature, it is applicable also to gears having tooth profiles which are not exactly circular, particularly when such tooth profiles are nearer to a circular arc in curvature than to an involute. In this case, the mean radii of curvature $r'$ and $R'$ are between the values given by Equation 5 for purely circular profiles and the values for involutes which are: $r'=r \sin \phi$ and $R'=R \sin \phi$. They are the nearer to the values given by Formula 5, the closer the tooth profiles are to circular arcs. The curvature radii, that is the radii from the pitch point to the curvature center, moreover, should fulfill Equation 3.

The invention is applicable also to gears produced by the "Revacycle" process, as disclosed in my pending applications, Serial Number 181,177, filed December 22, 1937, and Serial Number 182,838, filed December 31, 1937. In this process, a rotary disc cutter is employed that has a plurality of cutting blades arranged part-way around its periphery with a gap between the last and first blades and a tooth side of a tooth space of the gear blank is cut on each revolution of the cutter.

Tapered gears can, moreover, be produced with exact cylindrical side tooth surfaces, using the "Revacycle" process. In this case, the corresponding side-cutting edges of all of the finishing blades of the cutter have the same radii of curvature and the centers of curvature of the successive corresponding side-cutting edges are at progressively varying distances from the axis of the cutter. Successive blades are simply made of progressively different heights, the finish cutting blades which cut at the large end of the tooth surface or tooth space being, of greatest height. Both sides of a tooth space may be and preferably are cut at a time.

While several different embodiments of the invention have been described, it will be understood that the invention is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A pair of unequal gears for transmitting uniform motion in which the ratio of the effective curvature of the mating tooth profiles of the smaller and larger gears is greater than the ratio of the tooth number of the gears.

2. A pair of unequal gears for transmitting uniform motion having teeth which are longitudinally straight in development and tooth surfaces which change in pressure angle from one end of the teeth to the other, the profiles of said teeth being, for the full operative height of the teeth, single convex circular arcs.

3. A pair of tapered gears for transmitting uniform motion, each of which has tooth surfaces which are portions of single convex cylindrical surfaces whose axes extend longitudinally of the teeth and whose straight line elements are inclined to the pitch surfaces of the gear.

4. A pair of tapered gears for transmitting uniform motion, each of which has tooth surfaces which are portions of single convex conical surfaces whose axes extend longitudinally of the teeth.

5. A pair of straight toothed gears for transmitting uniform motion whose side tooth surfaces are crowned longitudinally and, for the full operative height of the teeth, are of single circular arcuate profile shape.

6. A pair of straight tooth gears each of which has side tooth surfaces which, for the full operative height of the teeth, are single convex circular arcs, the opposite sides of spaced teeth of each gear having the same center of curvature.

7. A pair of straight toothed gears for transmitting uniform motion, each of which has teeth whose profiles are single convex circular arcs, mating tooth surfaces of the gears having straight line elements which are inclined to one another.

8. A pair of unequal gears for transmitting motion, each of which has cylindrical side tooth surfaces whose profiles, for the full operative height of the teeth, are single convex circular arcs, the pressure angles of the tooth surfaces of both members of the pair changing from one end of the teeth to the other.

9. A gear having longitudinally inclined teeth whose side tooth surfaces are of circular arcuate profile and conical.

10. A pair of mating gears for transmitting uniform motion, each of which has side tooth surfaces which, for the full operative height of the teeth, are single convex circular arcs, the ratio of profile curvature of mating tooth surfaces of the two gears being greater than the ratio of the tooth numbers of the gears.

11. A gear having teeth which are longitudinally straight in development whose side surfaces are of constant single circular arcuate profile curvature along their lengths, the axis of curvature of a tooth surface being inclined to the pitch line of the surface.

12. A straight toothed gear having teeth whose active tooth surfaces are portions of single cylindrical surfaces, the axis of curvature of a tooth surface being inclined to the pitch surface of the gear.

13. A gear having longitudinally straight teeth whose active tooth surfaces are portions of single conical surfaces, the axis of curvature of a tooth surface being inclined to the pitch surface of the gear.

14. A pair of tapered gears having longitudinally inclined teeth whose side tooth surfaces are conical and of single convex circular arcuate profile shape, the pressure angle of said tooth surfaces decreasing from the large to the small ends of the teeth.

15. A tapered gear having teeth which are longitudinally straight in development and which have side tooth surfaces that are portions of convex cylindrical surfaces whose straight line elements extend in the direction of the length of the teeth.

16. A tapered gear having teeth which are longitudinally straight in development and which have side tooth surfaces that are portions of conical surfaces, the axis of each conical tooth surface being approximately parallel to the bottom of a tooth space of the gear.

ERNEST WILDHABER.